Dec. 12, 1961   R. R. BANKS ET AL   3,012,970
METHOD OF PREPARING A CHARGE FOR A FURNACE
Filed July 27, 1959
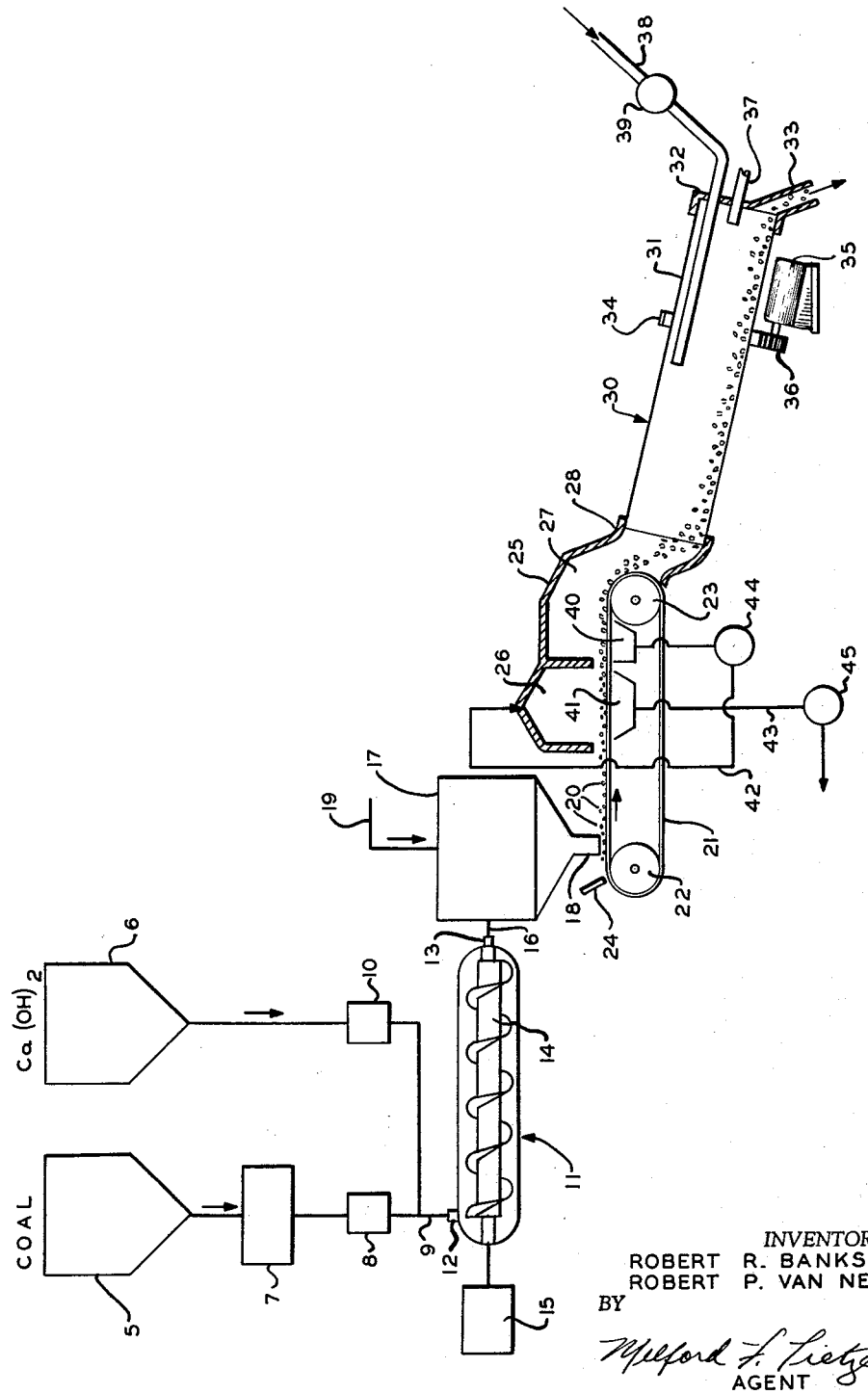
INVENTORS
ROBERT R. BANKS
ROBERT P. VAN NESS
BY
*Milford F. Lietze*
AGENT

3,012,970
METHOD OF PREPARING A CHARGE FOR A FURNACE

Robert R. Banks, Maplewood, and Robert P. Van Ness, South Orange, N.J., assignors to Air Reduction Company, Incorporated, New York, N.Y., a corporation of New York
Filed July 27, 1959, Ser. No. 829,843
9 Claims. (Cl. 252—188.3)

This invention relates to a method of preparing a charge for a furnace. The invention pertains, in one of its more specific aspects, to a method of preparing an agglomerate charge for the production of calcium carbide in an electric arc furnace.

It is the usual practice to produce calcium carbide by the reduction reaction of carbon and calcium oxide in an electric furnace. The carbon and calcium oxide constitute the charge which is treated in the furnace.

The charge may consist of lumps of a suitable carbonaceous material and lumps of calcium oxide or a suitable calcium oxide source material. Proper proportions by weight of lumps of both materials are introduced into the furnace and subjected to heat treatment in a manner well known to the art, whereby to produce the calcium carbide.

This method has a number of objections. For one thing, it is difficult to achieve proper distribution of the materials and desirable intimate contact between the carbon and the calcium oxide. As a result the efficiency of the furnace is adversely affected. Moreover, the quality of the product and the economy of the operation suffer.

The charge may comprise an agglomerate in the form of pellets of suitable size and shape and consisting of homogeneous mixtures of a carbonaceous material and a calcium oxide source material in requisite proportions by weight. Such pellets may be prepared in the manner disclosed in the F. R. Balcar et al. Patent No. 2,674,581, granted April 6, 1954, for "Preparation of a Charge for a Calcium Carbide Furnace."

Charges prepared in accordance with the teachings of the Balcar et al. patent contemplate homogeneous mixtures of the essential materials and thereby overcome certain of the objections of the first-mentioned method. The Balcar et al. patent teaches forming a properly proportioned, homogeneous, extrudable, intimate mixture comprising coal, calcium hydrate and water, extruding and cutting the mixture into pellets, drying the pellets at a temperature of about 400° F. and then coking and calcining the components of the pellets in a rotary kiln at a temperature of about 1800° F. The pellets are subjected to attrition and tumbling in the course of movement through the kiln.

The use of rotary kiln or similar means of effecting the heating of a pelletized charge wherein the charge is agitated or tumbled as it is progressively moved through a heating zone is deemed to be highly advantageous for calcining and coking pelletized charges for a calcium carbide furnace. For one thing the rotary kiln is capable of being subjected to the extremely high temperatures required for the heat treating process over prolonged periods of time without detrimental effect to the apparatus and without requiring undesired and costly delays or shutdowns for repairs and replacement. Furthermore, it has been found that by the constant movement or tumbling of the pellets as the body of charge is passed through the kiln, a more uniform heating and desirable heat gradient within the charge body may be effectively maintained as compared to methods of heating such as in a fixed bed or by means of a moving grate type of conveyor. Also, the rotary kiln method of heat treatment has been found to diminish the loss of fixed carbon in the resultant charge as compared with the loss accompanying heating by other methods.

It has been ascertained that the attrition and tumbling to which the pellets are subjected during the coking and calcining step in a rotary kiln reduce the yield of usable pellets. Some of the dried pellets introduced into the kiln break into several pieces, wear down substantially and/or are reduced to fines.

Consequently, there has not been up to the present time any completely suitable process for the heat treatment of pellets in the preparation of a charge for calcium carbide furnace or any such process which enables the advantageous employment of a rotary kiln method of heat treatment without suffering the loss of unusable, broken or disintegrated pellets that are normally obtained as a result of rotary kiln heating.

The present invention effectively overcomes the difficulties mentioned above. The practice of this invention minimizes pellet breakage and production of fines in the course of coking and calcining the pellets, and permits the advantageous use of rotary kiln mode of heat treatment without the accompainment of these occurrences.

We have discovered that breakage and erosion of pellets during the coking and calcining operation performed in a kiln or in a similar type of system for heat treatment wherein the pellets are tumbled or agitated during the heating may be substantially eliminated by properly pretreating the pellets. Such treatment, in a broad sense, consists of heating the pellets at an elevated temperature in an initial phase of heat treatment during which the pellets are maintained in a relatively quiescent state, that is, without substantial relative movement or without being subjected substantially to attrition during which phase the physical strength of the pellets undergoes a substantial increase rendering them greatly more resistant to breakage, etc. for the remainder of the heat treatment in which the pellets may be handled in the usual manner. Such treatment may be accomplished effectively by heating the pellets at an elevated temperature for a sufficient length of time to cause at least surface binding or fusion between the particles of coal and the immediately adjacent particles of the calcium oxide source material thereby forming a firmer adhesion between the coal and the calcium oxide source material particles. This treatment advantageously is performed in a nonoxidizing atmosphere in order to avoid reducing or destroying the binding action of the coal. Such treatment strengthens the pellets; and, as a consequence, the particles are better able to withstand attrition and tumbling, without undue breakage or wear, in the course of subsequent treatment in a rotary kiln or other apparatus wherein the coal and calcium oxide components of the pellets are, respectively, coked and calcined.

An object of the invention is to provide an improved method for preparing a charge for a furnace.

Another object of the invention is to improve the useful product yield by minimizing breakage and production of fines in the course of preparing a charge of the character indicated.

A further object of the invention is to improve the thermal efficiency and thereby effect cost economies in preparing a charge for subsequent treatment in a furnace.

To the end that the foregoing objects may be attained, a preferred method of preparing a charge for the production of calcium carbide in a furnace includes the steps of forming small pellets from an aqueous mixture of finely divided particles of coking coal and small particles of a calcium oxide source material, passing the pellets through a first heating zone wherein the pellets are heated to a temperature within the range of from 212° F. to 600° F. to evaporate the free moisture content of the pellets and thereby dry the same, passing the dried pellets through a second heating zone wherein they are heated to a temperature within the range of from 600° F. to 1200° F. to cause fusion of the coal particles and bonding between the coal and calcium oxide source material, then transmitting the pellets into a firing zone wherein they are heated to a temperature within the range of from 900° F. to 2400° F. to effect evolution of volatiles in the coal and calcining of the calcium oxide source material, maintaining non-oxidizing atmospheres in the above-mentioned zones, subjecting the evolved volatiles to incomplete combustion in the firing zone, moving the products of combustion through the firing zone counter-current to the general direction of movement of the pellets in that zone, transmitting the products of combustion in the firing zone successively through the second and first heating zones to furnish heat to the pellets in the course of their passage through the second and first heating zone, and preventing substantial pellet attrition in the course of their passage through the first and second heating zones.

The essential ingredients of the pellets are coking coal and a calcium oxide source material. The coking coal serves a dual function. First, it forms a strong bond between the solid particles of each pellet, and secondly, it is a raw material for the eventual production of the calcium carbide. Many bituminous coals possess the important property of passing through a fluid or plastic state when heated to a temperature within a predetermined range. The coking coal ingredient of the pellets may consist of such a coal alone or admixed with coke, provided that the Gieseler number of the mixture is 100 or greater. For best results, the coking coal should be finely divided and of a size not greater than 4 mesh (to pass a 4 mesh U.S. Standard screen), and preferably finer than 20 mesh.

The calcium oxide source material may consist of any single material or mixture of materials selected from the group consisting of (1) calcium hydrate ($Ca(OH)_2$) in the form of a sludge, in a dry state or mixtures thereof, (2) calcium carbonate or limestone ($CaCO_3$) and (3) calcium oxide or quicklime ($CaO$). The solid component of the calcium oxide source material should be fine enough to pass through a 200 mesh screen.

Calcium hydrate sludge is preferred as the calcium oxide source material since it is inexpensive and is available in large quantities as a by-product from the conversion of calcium carbide into acetylene. The moisture content of calcium hydrate sludge is usually quite high, frequently ranging from 40% to 50% by weight. When such a sludge is used it preferably is first partly dehydrated so that the moisture content of the desired mixture of coal and calcium hydrate does not exceed 20%. The sludge may be dehydrated prior or subsequent to admixing with the coal. It is preferred to effect dehydration prior to mixing with coal in order to prevent objectionable oxidation of the coal. It is recommended that the sludge be completely dehydrated to obtain dry calcium hydrate and then admix the dry hydrate with dry coal and water to obtain a homogeneous mixture containing approximately 20% moisture. This mixture is in the nature of a heavy paste. The ratio of fixed carbon to calcium oxide in the mixture should be within the range from about 1:1.55 to 1:2.00.

Small masses of the mixture are formed into pellets of any desired shape, such as spherical, cylindrical, cubical, irregular, or any other configuration. The pellets may be formed by extruding, nodulizing, briquetting or any other procedure known to the art.

The pellets are initially treated in a first heating zone wherein they are heated to a temperature within the range of from 212° F. to 600° F. to evaporate their free moisture content and dry the pellets. The first heating zone is preferably maintained at a temperature of about 400° F. During this step, the pellets are carried through the heating zone by a grate or a perforate conveyor in a manner to prevent attrition of the pellets.

The dried pellets are then carried by the grate or conveyor through a second heating zone wherein they are heated to a temperature within the range of from 600° F. to 1200° F., and preferably within the narrower range of from 750° F. to 1100° F. In the course of movement through the second heating zone, the coal particles of each pellet are rendered fluid or plastic. This causes fusion and firm adherence between the coal and calcium hydrate particles of each pellet, thereby strengthening the pellets and enabling them to withstand subsequent attrition and/or tumbling without undue wear or breakage.

The fused pellets are next passed through a firing zone. This zone may consist of a conventional rotary kiln wherein the pellets are fired, tumbled and moved in the usual manner known to the art. The kiln is maintained at a temperature within the range of from 900° F. to 2400° F., and preferably within the narrower range of from 1400° F. to 1800° F. to effect evolution of the volatiles within the coal and calcining of the calcium oxide source material. By virtue of the pellets having been strengthened by treatment in the second heating zone, they successfully resist breakage and wear during treatment in the kiln. In other words, substantially all of the pellets introduced into the kiln are recovered as useful products following treatment within the kiln.

The volatiles evolved from the pellets in the firing zone advantageously are subjected to incomplete combustion in that zone. Air to support such combustion may be introduced into the kiln above the mass of pellets. The products of combustion may be passed through the firing zone, in a direction which is counter-current to the general direction of movement of the pellets in that zone and also may be successively transmitted through the second and first heating zone to supply heat to the pellets in those zones. The atmospheres in the above-referred to zones advantageously are non-oxidizing.

The enumerated objects and other objects, together with the advantages of the invention, will be readily apparent to persons versed in the art from the following further description taken in conjunction with the accompanying drawing which is a combined flow diagram and schematic representation of a recommended apparatus for practicing the invention.

The drawing depicts a pair of hoppers 5 and 6 for containing and dispensing the essential raw materials. Hopper 5 contains a supply of a suitable coking coal while hopper 6 contains a supply of calcium oxide source material. This material is preferably a calcium hydrate sludge containing not more than 20% water. The particles of calcium oxide in the sludge are of small size and are capable of passing through a 200 mesh screen.

The coking coal is transmitted from hopper 5 into a crusher 7 wherein it is pulverized and finely divided to a size capable of passing through a 20 mesh screen. The pulverized coal passes through an automatic weigher 8 and thence to a conduit 9. Calcium hydrate passes through a corresponding automatic weigher 10 and thence to conduit 9. The weighers and conduit 9 feed the proper proportions of the coking coal and calcium hydrate into a combined mixer and conveyor unit 11 which includes an inlet 12, an outlet 13 and a screw type rotary conveyor 14. The screw conveyor is actuated by an electric motor 15 and is adapted to thoroughly mix and move the materials toward the right, as viewed in the drawing, and through outlet 13.

The mixture of coking coal and calcium hydrate is then transmittted by a conduit 16 into a pelletizer 17 having discharge nozzle 18. Make-up water, as required, is admitted into the pelletizer by way of a conduit 19. The pelletizer may be of any suitable construction known to the art and is adapted to form the mixture into small pellets 20, having any desired configuration, and discharge the pellets onto a continuous conveyor 21. The conveyor is perforate and may consist of an endless chain belt or a continuous grate. The conveyor is actuated by sprocket wheels or the like 22 and 23. An inclined barrier plate 24 prevents pellets from falling to the left of sprocket wheel 22. The upper portion of the conveyor moves in the direction indicated by the arrow and transmits the pellets through an oven 25. The oven is compartmented to define a first compartment or heating zone 26 and a second compartment or heating zone 27. The oven has a pellet discharge opening 28. The pellets in the course of passage through the oven are not subjected to appreciable attrition.

The pellets pass by gravity from the conveyor and through discharge opening 28 into a rotary kiln 30 wherein the coal is devolatilized and coked and the calcium oxide source material is calcined. The kiln includes an inclined, rotary cylinder having a stationary end closure 32 which is provided with a pellet discharge nozzle 33. Cylinder 31 carries a ring gear 34. An electric motor 35 drives a pinion 36 which meshes with ring gear 34 to impart rotation to the cylinder. A burner 37 projects through closure 32 and terminates in the cylinder. A line 38 supplies air from the atmosphere to the interior of the cylinder. This line is provided with a fan 39.

The apparatus includes a pair of wind boxes 40 and 41 which are disposed in the illustrated relative position in the oven. A conduit 42 establishes communication between wind box 40 and the upper portion of compartment 26. Another conduit 43 establishes communication between wind box 41 and the atmosphere. Conduit 42 is equipped with a fan 44 while conduit 43 is equipped with a similar fan 45.

The pellets, in the course of movement through compartment 26, are heated to a temperature within the range of between 212° F. and 600° F. This causes evaporation of the free water content of the pellets and substantial drying of the pellets. The dried pellets are then passed through compartment 27 wherein they are heated to a temperature within the preferred range of from 650° F. to 1200° F. This effects the earlier described fusion of the coal particles and bonding together of the coal and calcium oxide ingredients in each pellet.

The fused pellets then enter rotary kiln 30 by way of opening 28 wherein they are fired in a conventional manner. The kiln is preheated by burner 37. Air admitted into the kiln by way of line 38 combines with volatiles evolved from the coal to effect incomplete combustion of the volatiles. The temperature within the kiln is preferably maintained within the range of from 1400° F. to 1800° F. whereby the coal components of the pellets are devolatilized and coked and the calcium oxide components are properly calcined.

The products of combustion in the kiln, flow toward the left as viewed in the drawing and are successively passed through compartments 27 and 26. The products of combustion admitted into compartment 27 pass through a portion of conveyor 21 and wind box 40 and are transmitted by conduit 42 and fan 44 into the upper portion of compartment 26. The products of combustion admitted into compartment 26 pass through a portion of the conveyor and wind box 41 and are discharged through conduit 43 with the aid of fan 45. The products of combustion supply heat to the pellets in the course of their movement through each of the compartments.

It will be appreciated from the foregoing that the pellets are not subjected to attrition at the time that they are dried in compartment 26 or at the time they are fused in compartment 27. Thus, when the fused pellets are admitted into the rotary kiln, they are able to withstand attrition and tumbling to which they are subjected during the combined coking and calcining step. This minimizes pellet breakage or reduction in the size of the pellets due to attrition. Moreover, utilization of the products of incomplete combustion, as outlined above, for heating the pellets in compartments 27 and 26 effects substantial operational economies and protects the non-volatile carbon content of the pellets from oxidation.

The method of this invention is especially useful in preparing a charge which is suitable for the production of calcium carbide in an electric furnace. The method may also be employed in preparing other charges, such as a carbon-ore charge for use in smelting ores.

From the foregoing, it is believed that the method of the instant invention will be readily comprehended by persons trained in the art, without further description. It is to be clearly understood, however that various changes in the method of practicing the invention as outlined above may be resorted to without departing from the spirit of the invention, it being intended that matter contained in the description or shown in the drawing shall be interpreted as illustrative only and not in a limiting sense.

What we claim is:

1. The method of preparing an agglomerate charge for a calcium carbide furnace which comprises heating pellets consisting essentially of finely divided particles of coking coal and small particles of a calcium oxide source material, while maintaining said pellets in a heating zone in a substantially quiescent state relative to one another, to a temperature within the range of 600° F. to 1200° F. to cause at least some fusion of the coal particles to thereby increase the physical strength of said pellets and thereafter further heating and moving said pellets through a firing zone while moving said pellets relative to one another during passing through such firing zone and completing the coking and calcining of said pellets.

2. In a method of preparing a charge for a furnace, the steps of forming small pellets from a mixture consisting essentially of finely divided particles of coking coal having volatiles therein and a finely divided calcium oxide source material to be physically combined with said coking coal in obtaining the charge, passing the pellets through a heating zone in a manner to prevent substantial pellet attrition, heating the pellets in a non-oxidizing atmosphere in the course of passage thereof through the heating zone to a temperature within the range of from 600° F. to 1200° F. to cause fusion of the coal particles and bonding between the solid ingredients of each pellet, then transmitting the pellets into a firing zone, heating the pellets in the firing zone in a non-oxidizing atmosphere to a temperature within the range of from 900° F. to 2400° F. to effect evolution of the volatiles in the coal, and subjecting the evolved volatiles to incomplete combustion in the firing zone.

3. In a method of preparing a charge for the production of calcium carbide in a furnace, the steps of forming small pellets from a mixture of a first material consisting essentially of finely divided particles of coking coal having volatiles therein and small particles of a calcium oxide source material, selected from the group consisting of calcium hydrate, calcium carbonate and calcium oxide, passing the pellets through a heating zone in a manner to prevent substantial pellet attrition, heating the pellets in a non-oxidizing atmosphere in the course of passage thereof through the heating zone to a temperature within the range of from 600° F. to 1200° F. to cause fusion of the coal particles and bonding between the solid ingredients of each pellet, then transmitting the pellets into a firing zone, heating the pellets in the firing zone in a non-oxidizing atmosphere to a temperature within the range of from 900° F. to 2400° F. to effect evolution of the volatiles in the coal and calcining of the calcium oxide source material, and subjecting the evolved volatiles to incomplete combustion in the firing zone.

4. In a method of preparing a charge for the production of calcium carbide in a furnace, the steps of forming small pellets from a mixture of a first material consisting essentially of finely divided particles of coking coal having volatiles therein and small particles of a calcium oxide source material, selected from the group consisting of calcium hydrate, calcium carbonate and calcium oxide, passing the pellets through a heating zone in a manner to prevent substantial pellet attrition, heating the pellets in a non-oxidizing atmosphere in the course of passage thereof through the heating zone to a temperature within the range of from 750° F. to 1100° F. to cause fusion of the coal particles and bonding between the solid ingredients of each pellet, then transmitting the pellets into a firing zone, heating the pellets in the firing zone in a non-oxidizing atmosphere to a temperature within the range of from 1400° F. to 1800° F. to effect evolution of the volatiles in the coal and calcining of the calcium oxide source material, and subjecting the evolved volatiles to incomplete combustion in the firing zone.

5. The method according to claim 3 wherein the products of combustion in the firing zone are transmitted to the heating zone and supply heat to the pellets in the course of their passage through the heating zone.

6. In a method of preparing a charge for the production of calcium carbide in a furnace, the steps of forming small pellets from a mixture consisting essentially of water, finely divided particles of coking coal having volatiles therein and small particles of a calcium oxide source material, selected from the group consisting of calcium hydrate, calcium carbonate and calcium oxide, passing the pellets through a first heating zone in a manner to prevent substantial pellet attrition, heating the pellets in the course of their passage through the first heating zone to a temperature within the range of from 212° F. to 600° F. to evaporate the free water content of the pellets, passing the pellets through a second heating zone in a manner to prevent substantial pellet attrition, heating the pellets in the course of their passage through the second heating zone to a temperature within the range of from 600° F. to 1200° F. to cause fusion of the coal particles and bonding between the solid ingredients of each pellet, maintaining non-oxidizing atmospheres in the first and second heating zones, then transmitting the pellets through a firing zone, heating the pellets in the firing zone in a non-oxidizing atmosphere to a temperature within the range of from 900° F. to 2400° F. to effect evolution of the volatiles in the coal and calcining of the calcium oxide source material, and subjecting the evolved volatiles to incomplete combustion in the firing zone.

7. In a method of preparing a charge for the production of calcium carbide in a furnace, the steps of forming small pellets from a mixture consisting essentially of water, finely divided particles of coking coal having volatiles therein and small particles of a calcium oxide source material, selected from the group consisting of calcium hydrate, calcium carbonate and calcium oxide, passing the pellets through a first heating zone in a manner to prevent substantial pellet attrition, heating the pellets in the course of their passage through the first heating zone to a temperature within the range of from 212° F. to 600° F. to evaporate the free water content of the pellets, passing the pellets through a second heating zone in a manner to prevent substantial pellet attrition, heating the pellets in the course of their passage through the second heating zone to a temperature within the range of from 750° F. to 1100° F. to cause fusion of the coal particles and bonding between the solid ingredients of each pellet, maintaining non-oxidizing atmospheres in the first and second heating zones, then transmitting the pellets through a firing zone, heating the pellets in the firing zone in a non-oxidizing atmosphere to a temperature within the range of from 1400° F. to 1800° F. to effect evolution of the volatiles in the coal and calcining of the calcium oxide source material, and subjecting the evolved volatiles to incomplete combustion in the firing zone.

8. The method according to claim 7 wherein the products of combustion in the firing zone are successively transmitted through the second and first heating zones and supply heat to the pellets in the course of their passage through the second and first heating zones.

9. The method according to claim 7 wherein the products of combustion move through the firing zone countercurrent to the general direction of movement of the pellets therein.

References Cited in the file of this patent
UNITED STATES PATENTS

| | | |
|---|---|---|
| 1,875,249 | Mahler et al. | Aug. 30, 1932 |
| 1,877,123 | Bunce | Sept. 13, 1932 |
| 2,674,581 | Balcar et al. | Apr. 6, 1954 |
| 2,805,120 | Plant | Sept. 3, 1957 |